(12) United States Patent
Lee et al.

(10) Patent No.: US 7,375,607 B2
(45) Date of Patent: May 20, 2008

(54) DC TRANSFORMER WITH AN OUTPUT INDUCTANCE INTEGRATED ON A MAGNETIC CORE THEREOF AND A DC/DC CONVERTER EMPLOYING THE SAME

(75) Inventors: Chi-Hsiung Lee, Tu-Cheng (TW); Chau-Tung Fan-Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 328 days.

(21) Appl. No.: 10/955,125

(22) Filed: Sep. 30, 2004

(65) Prior Publication Data
US 2005/0243582 A1  Nov. 3, 2005

(30) Foreign Application Priority Data
Apr. 30, 2004  (TW) ............................. 93112192 A

(51) Int. Cl.
*H01F 17/06* (2006.01)
(52) U.S. Cl. ................................................ 336/178
(58) Field of Classification Search ............... 336/65, 336/83, 165, 170, 178; 363/13, 17, 47, 50, 363/153, 171
See application file for complete search history.

(56) References Cited

U.S. PATENT DOCUMENTS

| | | | |
|---|---|---|---|
| 2,173,905 A * | 9/1939 | Kalbskopf | ................... 363/77 |
| 2,513,512 A * | 7/1950 | Olthof | ......................... 323/347 |
| 4,055,740 A * | 10/1977 | Nakamura et al. | .......... 219/663 |
| 5,172,308 A | 12/1992 | Tohya | ........................... 363/16 |
| 5,355,296 A * | 10/1994 | Kuo et al. | .................... 363/43 |
| 5,555,494 A * | 9/1996 | Morris | ......................... 363/17 |
| 5,920,473 A | 7/1999 | Sturgeon | ...................... 363/98 |
| 7,136,293 B2 * | 11/2006 | Petkov et al. | ............... 363/126 |

FOREIGN PATENT DOCUMENTS

WO   WO 2004/040600   5/2004

\* cited by examiner

*Primary Examiner*—Tuyen T. Nguyen
(74) *Attorney, Agent, or Firm*—Wei Te Chung

(57) ABSTRACT

A DC/DC converter includes an input filter, a half-bridge converter without PWM (Pulse Width Modulation) control function, a synchronous rectifier, an output capacitor, and a DC transformer. The DC transformer includes a magnetic core, a primary winding, a first secondary winding, and a second secondary winding. The magnetic core of the DC transformer includes a first leg, a second leg having a first air gap, and a third leg having a second air gap. The first secondary winding is wound on the first leg and the second leg, and induces a first inductance by the first air gap. The second secondary winding is wound on the first leg and the third leg, and induces a second inductance by the second air gap.

13 Claims, 10 Drawing Sheets

US 7,375,607 B2

DC TRANSFORMER WITH AN OUTPUT INDUCTANCE INTEGRATED ON A MAGNETIC CORE THEREOF AND A DC/DC CONVERTER EMPLOYING THE SAME

BACKGROUND OF INVENTION

1. Field of the Invention

The present invention is related to a DC transformer, and more particularly to a DC transformer with an output inductance integrated on a magnetic core thereof and a DC/DC converter employing the same.

2. Description of the Prior Art

A typical transformer has a magnetic core and two insulated windings. When an alternating current flows to a primary winding, magnetic flux lines perpendicular to the windings in the magnetic core provide a voltage in a secondary winding, the voltage being directly proportional to the number of windings of the secondary winding. Therefore, with an appropriate winding number, a desired voltage can be obtained.

Referring to FIG. 11, this is a schematic diagram of a prior art DC/DC converter 11. The DC/DC converter 11 includes a DC transformer 10. The DC transformer 10 includes a primary winding and a secondary winding wound around a magnetic core 12. The primary winding receives an input voltage $V_{in}$ through an input filter 14 and a half-bridge converter without PWM (Pulse Width Modulation) control function 41, while the secondary winding outputs a voltage $V_o$ provided by the magnetic core 12 of the DC transformer 10 through a synchronous rectifier 42 and an output filter 16. If a turn ratio between the primary winding and the secondary winding is N, and the duty cycle of the DC transformer 10 is D, the output voltage $V_o$ can be expressed by $V_o = (D/2N)V_{in}$.

FIG. 12 is a schematic diagram of the magnetic core 12 and the primary and secondary windings of the DC transformer 10. The DC transformer 10 includes a primary winding 13, a first secondary winding 15, and a second secondary winding 17. The magnetic core 12 is an EE type core, which includes three legs (Leg1, Leg2, Leg3). The winding operation for the primary winding may be performed by winding the primary winding either around a first leg (Leg1), or around a second leg (Leg2) and a third leg (Leg3). The primary winding 13 shown in FIG. 12 is wound around Leg1. Correspondingly, the secondary winding can be wound in different manners. The secondary winding shown in FIG. 12 is wound around Leg1, with a portion of the secondary winding being extracted out from either side of a center tap 16. The first secondary winding 15 and the second secondary winding 17 are thereby formed.

FIG. 13 is a circuit diagram of the DC/DC converter 11 of FIG. 11. The DC/DC converter 11 includes the input filter 14 (C1, L1), the half-bridge converter without PWM control function 41 (capacitors C2, C3, switches Q1, Q2), the DC transformer 10, the synchronous rectifier 42 (switches Q3, Q4), and the output filter 16 (inductor L2, capacitance C4). The DC transformer 10 includes the magnetic core 12, the primary winding 13, the first secondary winding 15, the second secondary winding 17, and an auxiliary winding 19. The input filter 14 is used to filter the input voltage $V_{in}$. The primary winding 13 is connected to the half-bridge converter without PWM control function 41 (formed by the switches Q1, Q2 and the capacitors C2, C3), wherein the half-bridge converter 41 is used for driving the DC transformer 10. The first secondary winding 15 and the second secondary winding 17 are respectively connected to the switches Q3 and Q4 of the synchronous rectifier 42. The auxiliary winding 19 provides an operation voltage for the switches Q3 and Q4. The output filter 16 comprises the output inductor L2 and the output capacitance C4, and is used for filtering the voltage provided by the DC transformer 10, resulting in an output voltage $V_o$.

Usually, the above-described DC transformer includes an output filter provided by an output inductance and an output capacitor, for suppressing noise persisting in the output voltage. However, the output inductance may occupy a large area on a printed circuit board. The output inductance also has a tendency to dissipate power, which lowers the efficiency of power transformation.

SUMMARY OF INVENTION

It is therefore a primary objective of the claimed invention to provide a DC transformer with an output inductance integrated on the magnetic core to obviate the above problems.

It is another objective of the claimed invention to provide a DC/DC converter employing the above-described DC transformer.

According to the claimed invention, the DC transformer comprises: a magnetic core having air gaps therein; a primary winding wound around the magnetic core; a first secondary winding wound around the magnetic core for generating a first inductance by a first air gap of the magnetic core; and a second secondary winding wound around the magnetic core for generating a second inductance by a second air gap of the magnetic core.

The DC/DC converter of the claimed invention comprises: an input filter; a half-bridge converter without PWM (Pulse Width Modulation) control function; the above-described DC transformer with an integrated output inductor; a synchronous rectifier; and an output capacitor connected to the first secondary winding, a center tap of the second secondary winding, and the synchronous rectifier.

These and other objectives of the claimed invention will become obvious to those of ordinary skill in the art after reading the following detailed description of preferred embodiments, which are illustrated and elucidated in the various figures and drawings, in which:

DETAILED DESCRIPTION OF THE PREFERRED EMBODIMENT OF THE PRESENT INVENTION

Figure 1:
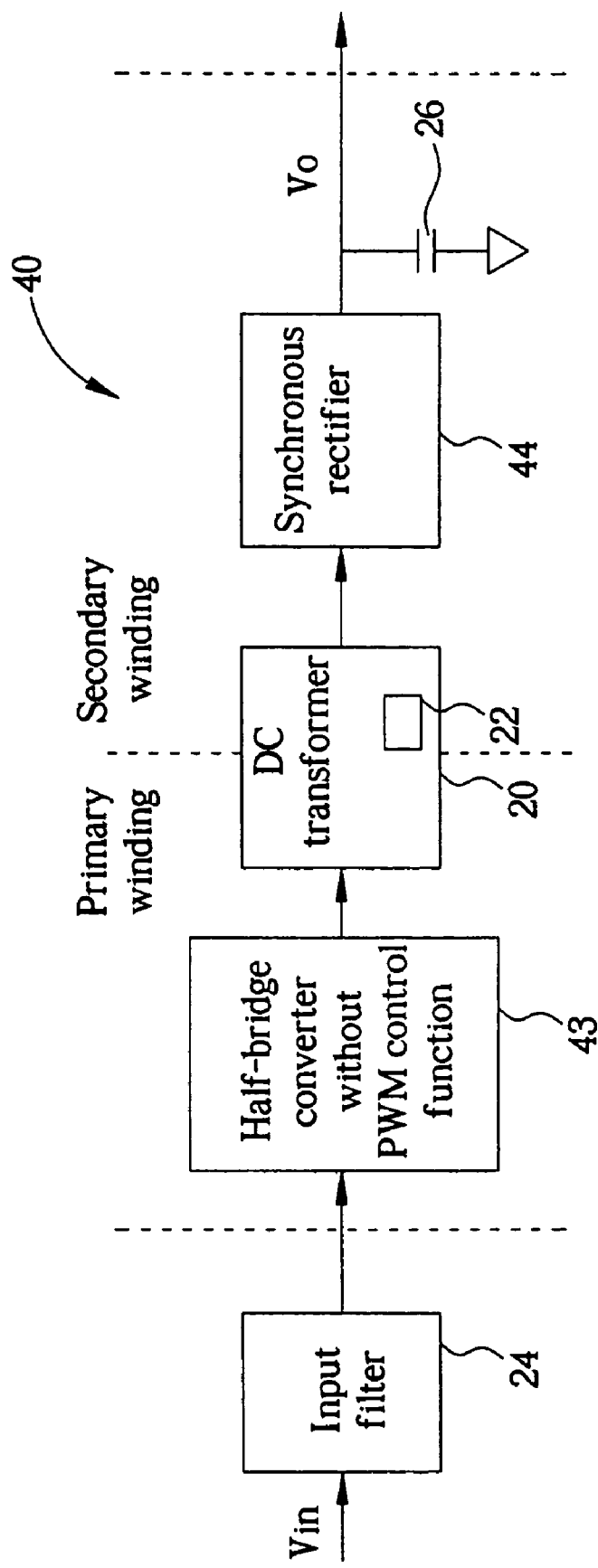
FIG. 1 is a block diagram of an inventive DC/DC converter, which comprises a DC transformer.

Please refer to FIG. 1, which is a schematic diagram of a DC/DC converter 40 in accordance with a preferred embodiment of the present invention. The DC/DC converter 40 comprises a DC transformer 20 having a magnetic core 22 therein. The magnetic core 22 comprises a primary winding and two secondary windings, wherein the primary winding receives an input voltage $V_{in}$ through an input filter 24. The DC/DC converter 40 also comprises a half-bridge converter without PWM control function 43 and a synchronous rectifier 44. The most significant difference between the inventive DC transformer 20 and the prior DC transformer 10 is that an output inductance which serves as a part of the output circuit of the DC/DC converter 40 is integrated into the magnetic core 22, so that voltage from the secondary winding of the magnetic core 22, after being rectified with the synchronous rectifier 44, is filtered by an output filter 26 that comprises a capacitor only. As a result, an output voltage $V_o$ is obtained.

Figure 2:
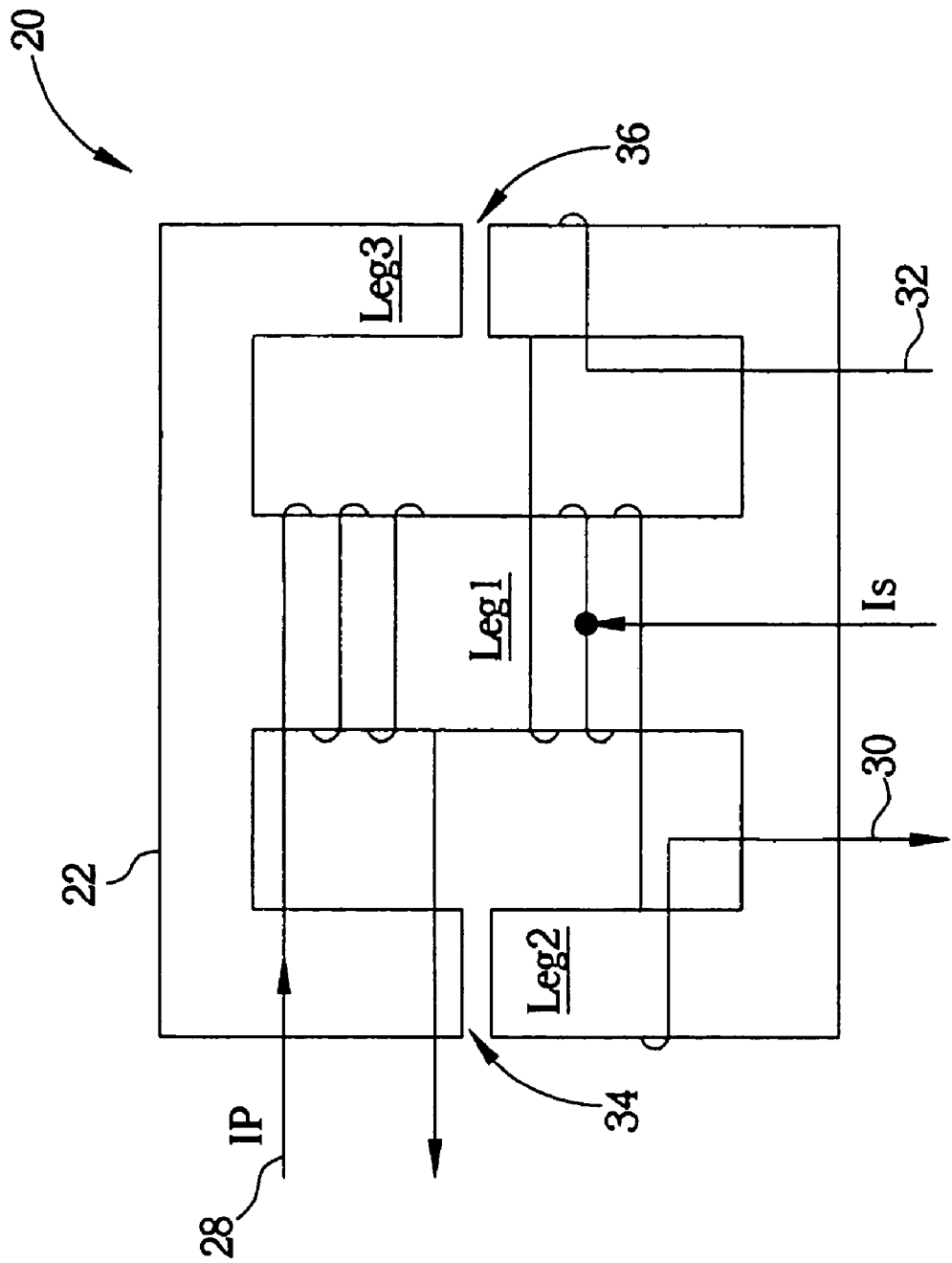
FIG. 2 is a schematic diagram of a magnetic core and windings of the DC transformer of FIG. 1.

Please refer to FIG. 2, which is a schematic diagram of the magnetic core 22 and the primary and secondary windings of the DC transformer 20. An EE type magnetic core 22 is shown by way of example. In principle, the secondary winding of the magnetic core 22 is wound around a leg of the magnetic core 22 which has a gap for generating an equivalent inductance, so as to integrate an output inductance into the magnetic core 22 of the DC transformer 20. The EE type magnetic core 22 includes three legs (Leg1, Leg2, Leg3). A small first gap 34 and second gap 36 are respectively integrated in a second leg (Leg2) and a third leg (Leg3), while a primary winding 28 is wound around a first leg (Leg1). Additionally, the secondary winding is also wound around the first leg (Leg1), while a portion of the secondary winding is extracted from either side of a center tap to form a first secondary winding 30 and a second secondary winding 32. Part of the first secondary winding 30 is also wound around the second leg (Leg2), and part of the second secondary winding 32 is also wound around the third leg (Leg3), so as to generate an equivalent inductance.

Figure 3:
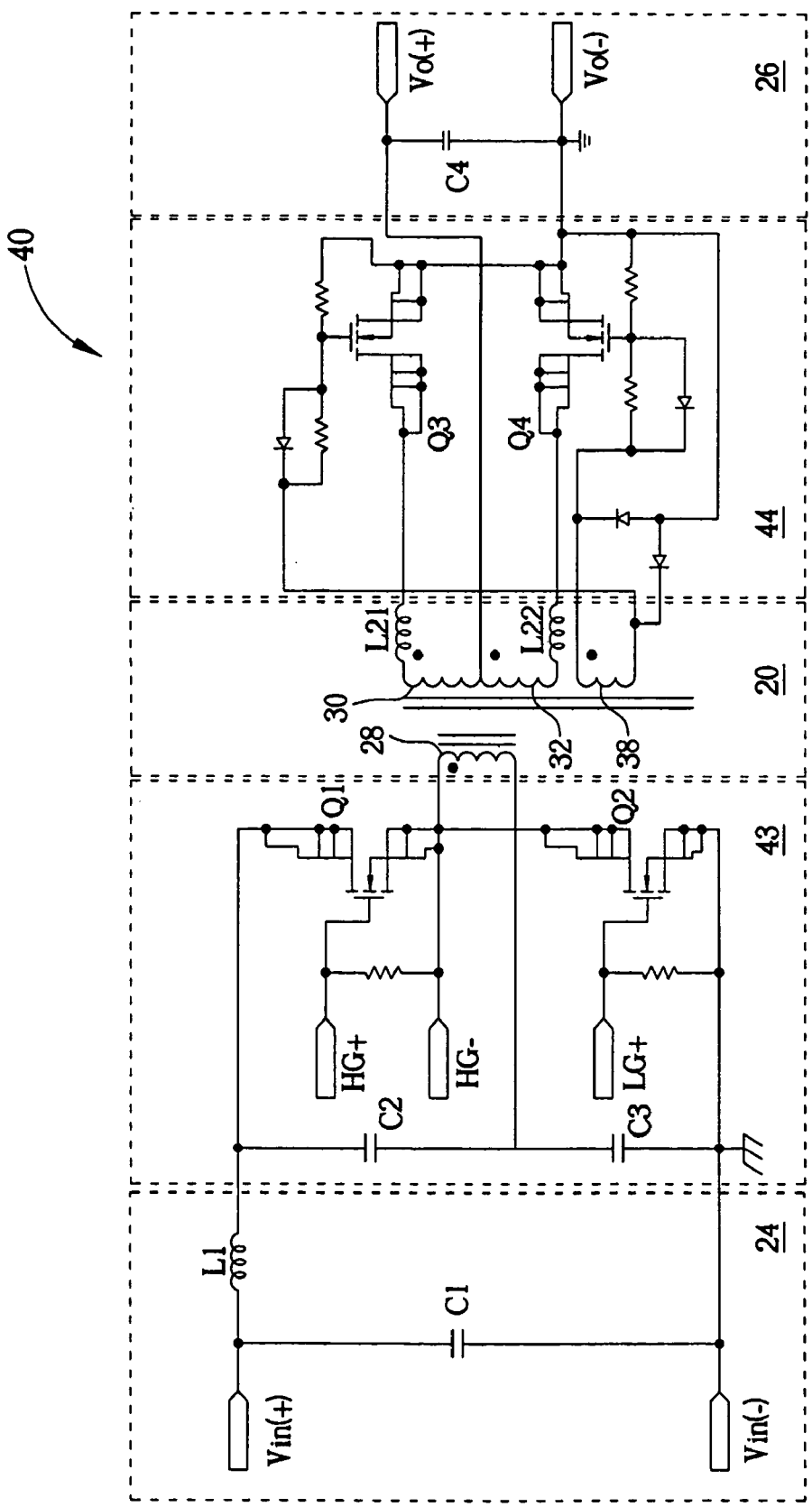
FIG. 3 is a circuit diagram of the DC/DC converter of FIG. 1.

Please refer to FIG. 3, which is a circuit diagram of the inventive DC/DC converter 40. The input filter 24 includes an input inductor L1 and an input capacitor C1 for filtering an input voltage $V_{in}$. The primary winding 28 connects to a half-bridge converter without PWM control function 43 (capacitors C2, C3, switches Q1, Q2), which is used to drive the DC transformer 20. The first secondary winding 30 and the second secondary winding 32 are connected to two switches Q3 and Q4 of the synchronous rectifier 44 respectively. An auxiliary winding 38 provides power for the switches Q3 and Q4. The output filter 26 includes only one output capacitor C4 for filtering voltage provided by the DC transformer 20. The first secondary winding 30 and the second secondary winding 32 wound around the magnetic core 22 can be regarded as being respectively connected to a first equivalent inductance L21 and a second equivalent inductance L22, which are generated by virtue of the air gaps 34, 36 of the magnetic core 22 and respectively serve as two output inductances of the first and second secondary windings 30, 32. Therefore, the output filter 26 requires only one output capacitor C4 in order to process the voltage provided by the DC transformer 20.

Figure 4:
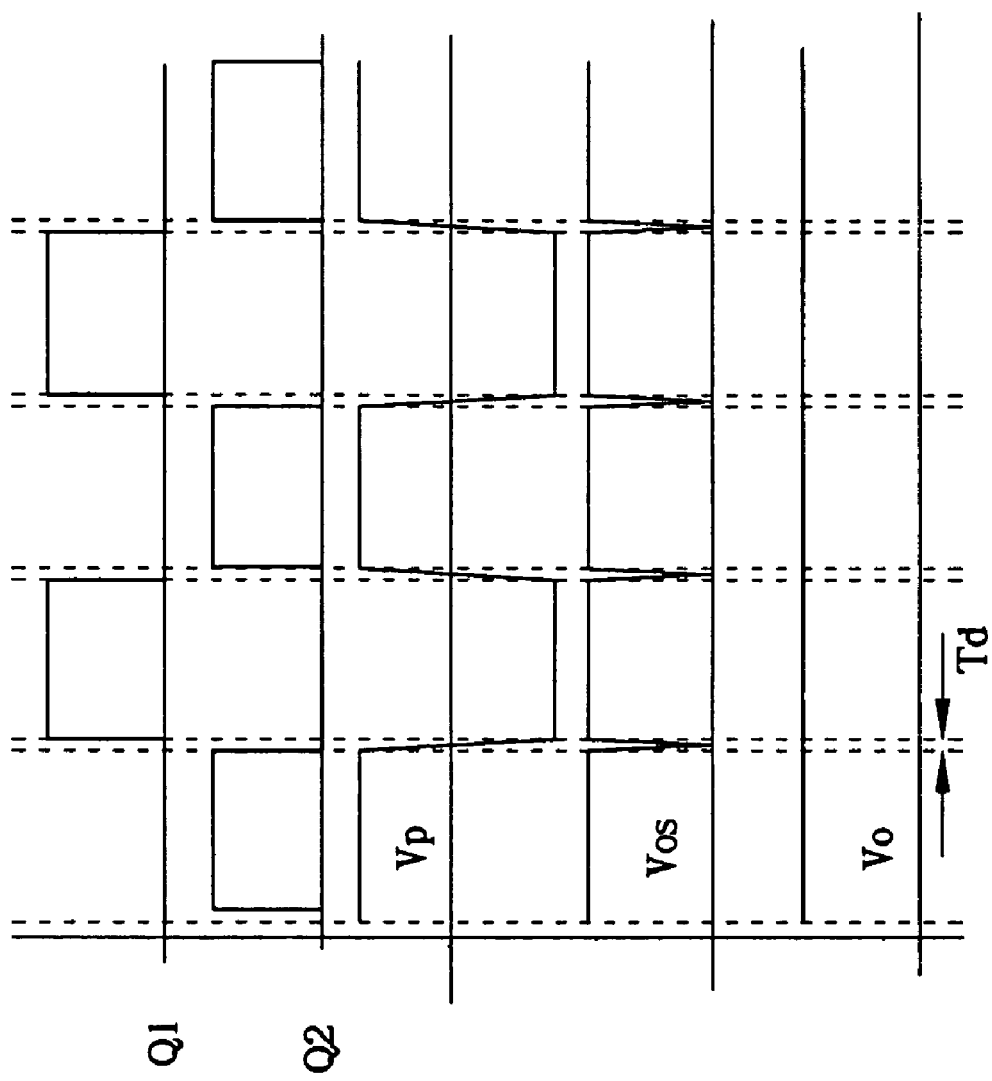
FIG. 4 is a waveform diagram of the DC/DC converter of FIG. 1.

Please refer to FIG. 4, which is a waveform diagram of the DC/DC converter 40 of FIG. 3. From top to bottom in FIG. 4, the first waveform illustrates a control signal of the switch Q1, the second waveform illustrates a control signal of the switch Q2, the third waveform illustrates a terminal voltage $V_p$ of the primary winding, the fourth waveform illustrates a synchronous rectification voltage $V_{os}$, and the fifth and final waveform illustrates an output voltage $V_o$. The switches Q1 and Q2 are working in complementary mode, and their duty cycles are close to 50%. That is, when the switch Q1 is turned on, the switch Q2 is turned off. The operations of the DC/DC converter 40 can be divided into four stages. The first stage of operation can be characterized by allowing the switch Q1 to be turned on and allowing the switch Q2 to be turned off. Thus, the voltage from the primary winding 28 is coupled to the first secondary winding 30 through the magnetic core 22, and the magnetization energy is stored in the first equivalent inductance L21. Then, as the switch Q2 is about to change its state from OFF to ON, the operation of the DC/DC converter 40 needs to enter a second stage of operation by allowing the switch Q1 and Q2 to be turned off, so as to prevent the occurrence of a contingency that the switches Q1 and Q2 are turned on simultaneously, which may cause serious circuit damage. During the second stage, both switches Q1 and Q2 remain OFF for a duration $T_d$, which is referred to as "dead time." During the dead time period, the primary winding 28 of the DC transformer 20 provides no magnetization energy to be coupled to the first secondary winding 30 and the second secondary winding 32, and the first secondary winding 30 transmits the magnetization energy stored in the first equivalent inductance L21 to the output capacitor 26. Subsequently, a third stage of operation is entered, which is characterized by allowing the switch Q1 to be turned off and allowing the switch Q2 to be turned on, so that the voltage of the primary winding 28 is coupled to the second secondary winding 32 through the magnetic core 22, causing the second secondary winding 32 to store magnetization energy in the second equivalent inductance L22. For the same reason as described above, as the switch Q1 changes its state from ON to OFF, the operation of the DC/DC converter 40 proceeds to a fourth stage of operation in which the switches Q1 and Q2 are both turned off, so as to prevent the occurrence of a contingency that the switches Q1 and Q2 are turned on simultaneously, which may cause serious circuit damage. After the fourth stage is completed, the cycle starts again from the first stage.

Figure 5:
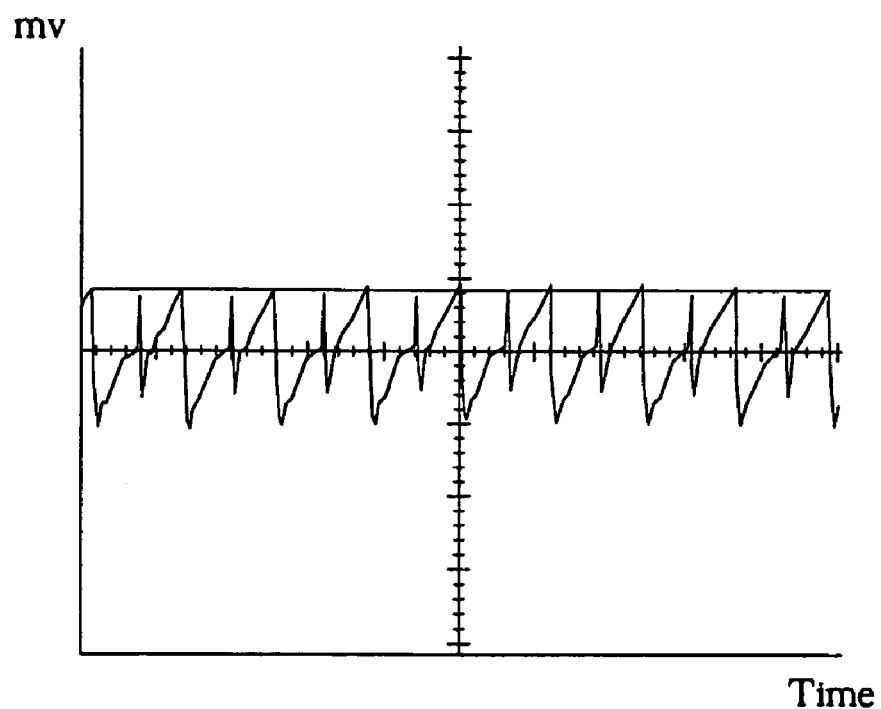
FIG. 5 is a waveform diagram of the output voltage of a prior DC/DC converter illustrated in FIG. 11.
Figure 6:
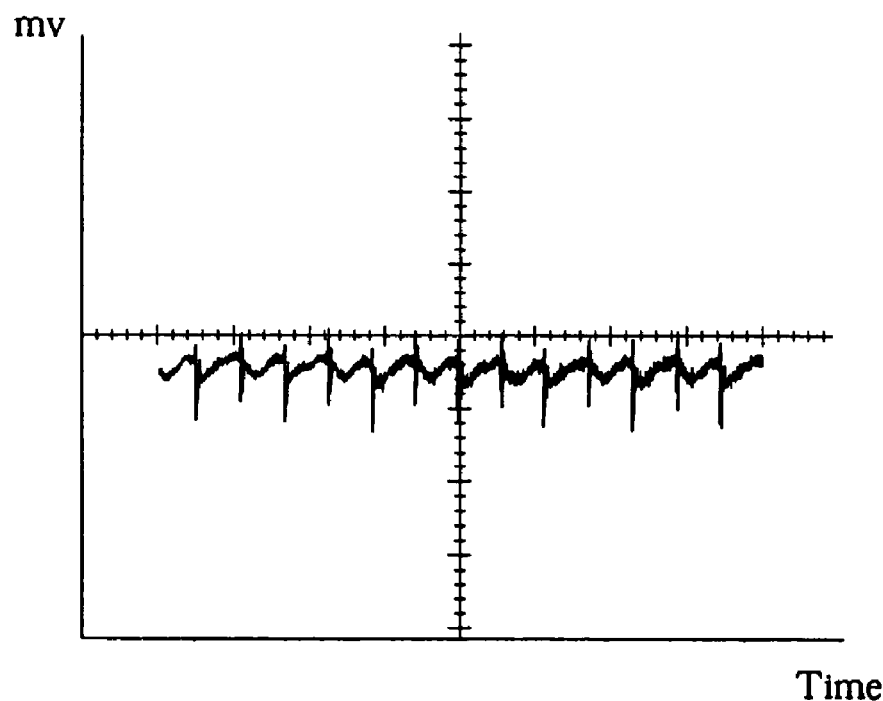
FIG. 6 is a waveform diagram of the output voltage of the DC/DC converter of FIG. 1.

Please refer to FIG. 5 and FIG. 6, which respectively show simulations of the waveforms of the output voltages of the prior art DC/DC converter 11 and of the inventive DC/DC converter 40. In FIG. 5, the input voltage $V_{in}$=48V, the output voltage $V_o$=5V, the output current $I_o$=10 A, the peak-to-peak ripple value of the output voltage=42 mV, and the output efficiency=90%. In FIG. 6, the input voltage $V_{in}$=48V, the output voltage $V_o$=5V, the output current $I_o$=10 A, the peak-to-peak ripple value of the output voltage=31.9 mV, and the output efficiency=90.5%. Therefore, as can be understood from the simulated statistics, the inventive DC transformer 20 can decrease the peak-to-peak ripple value of the output voltage, and increase the output efficiency of the DC/DC converter 40.

Figure 7:
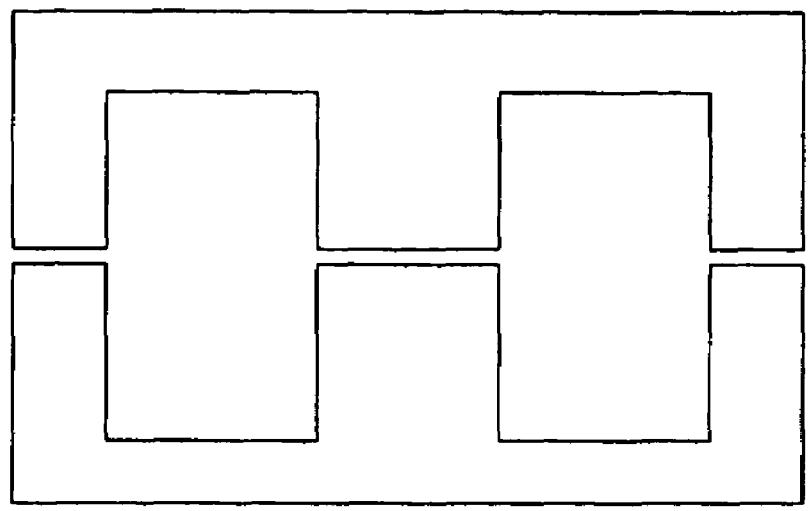
FIG. 7 is a schematic diagram of an EE type magnetic core according to the present invention.
Figure 8:
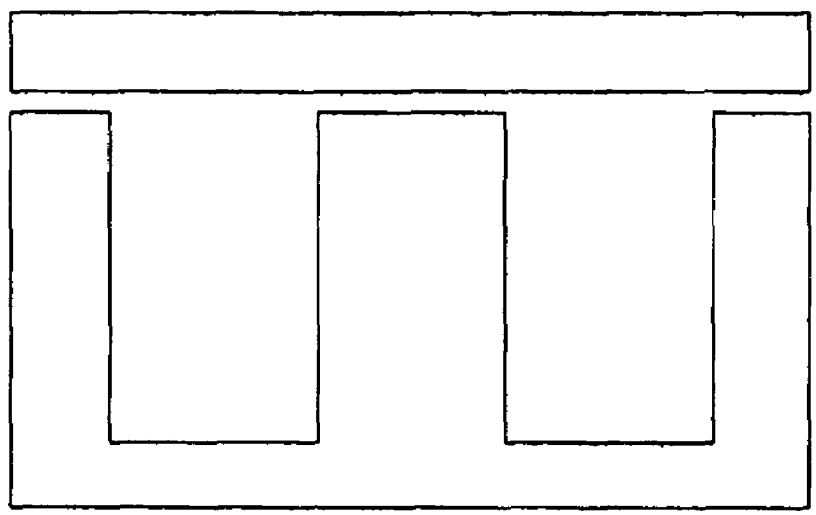
FIG. 8 is a schematic diagram of an EI type magnetic core according to the present invention.
Figure 9:
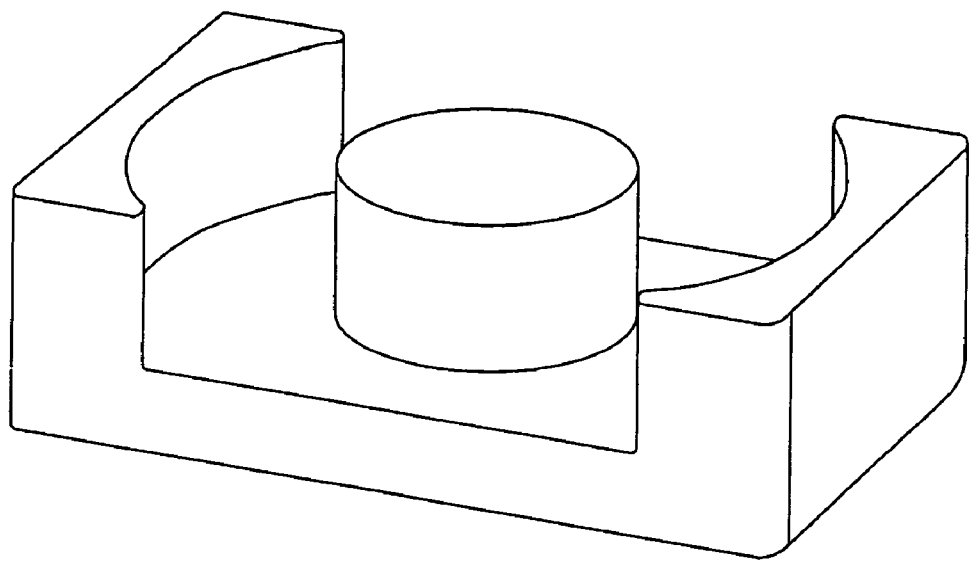
FIG. 9 is a schematic diagram of an EQ type magnetic core according to the present invention.
Figure 10:
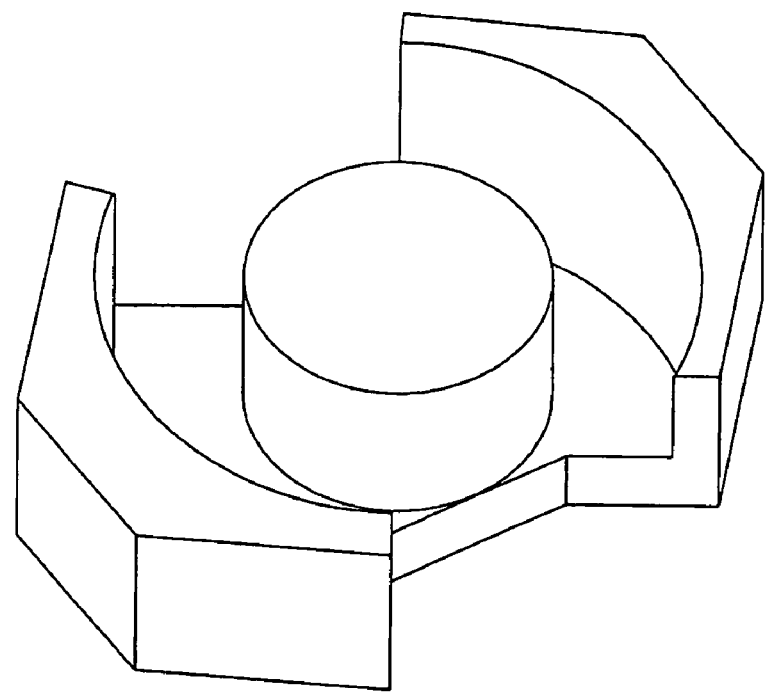
FIG. 10 is a schematic diagram of an RM type magnetic core according to the present invention.
Figure 11:
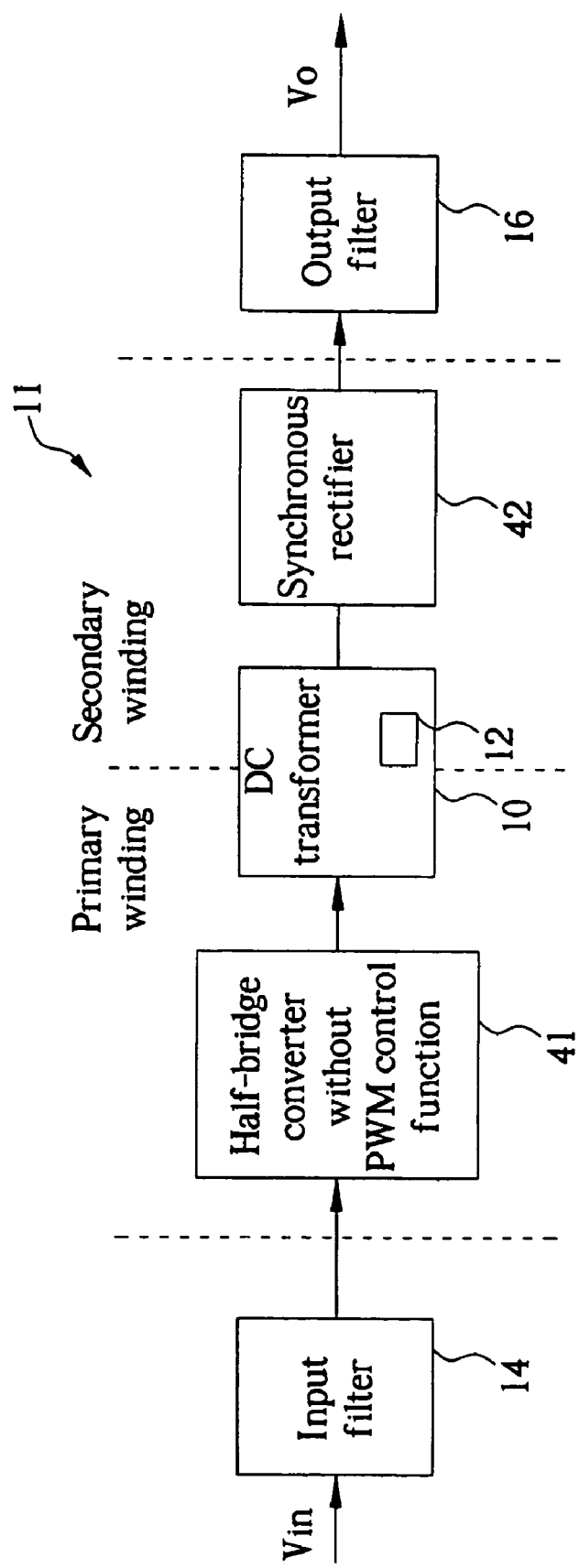
FIG. 11 is a schematic diagram of a prior DC/DC converter, which comprises a DC transformer.
Figure 12:
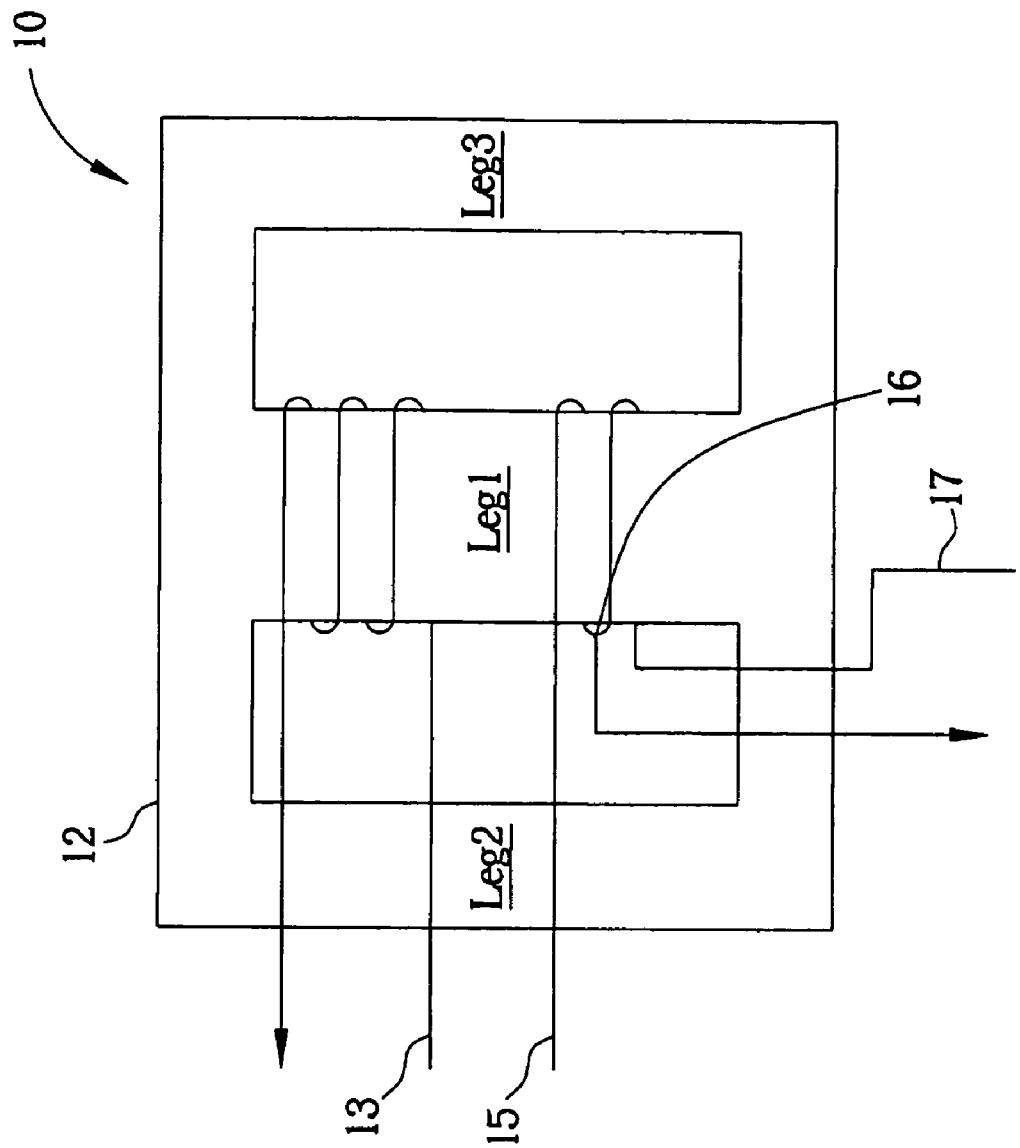
FIG. 12 is a schematic diagram of a magnetic core and windings of the DC transformer of FIG. 11.
Figure 13:
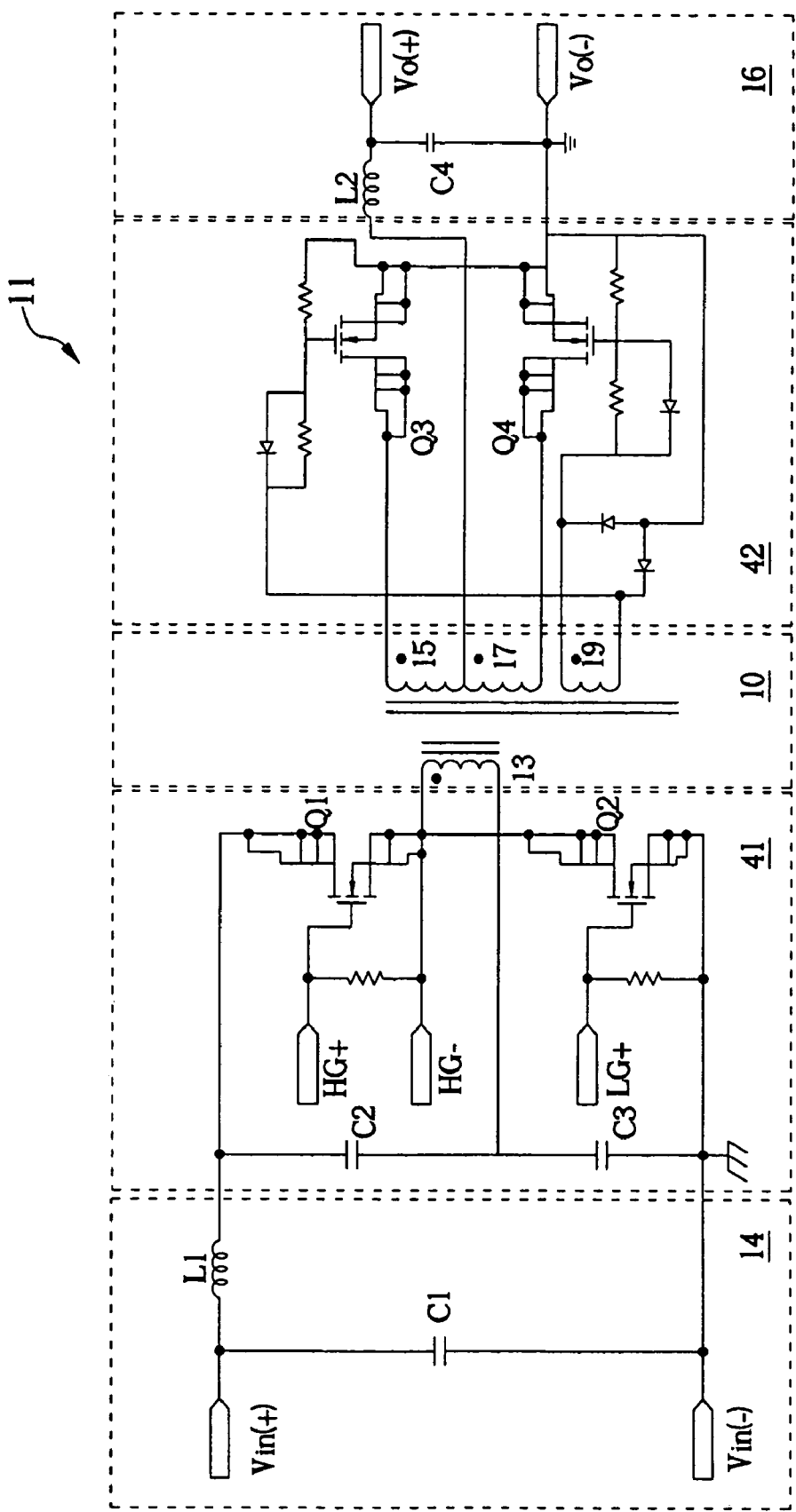
FIG. 13 is a circuit diagram of the DC/DC converter of FIG. 11.

Please refer to FIG. 7 and FIG. 8, which respectively are schematic diagrams of EE type and EI type magnetic cores according to the present invention. As shown in FIG. 7 and FIG. 8, in practical application, each of the magnetic cores includes three air gaps that can be produced easily, and therefore the manufacturing cost of each magnetic core can be lowered. In addition to the EE and the EI type magnetic cores, the magnetic core can be of EQ type as shown in FIG. 9, or of RM type as in FIG. 10. The dimension of each air gap of the magnetic core is between 0.02 mm and 0.07 mm.

In summary, the secondary winding of the DC transformer is wound around the legs of an EE, EI, EQ, or RM type magnetic core having air gaps for generating equivalent inductance, so that the noise persisting in the output voltage can be suppressed by the DC transformer without the need for an additional output inductance. This kind of DC transformer with an integrated inductance can downsize a power supply apparatus, reduce inductance loss, and further increase the power conversion efficiency and power density of the DC/DC converter.

The inventive DC transformer 20 integrates the output inductance into the magnetic core 22, wherein the magnetic core 22 is provided with air gaps and different winding configurations for the secondary winding. In comparison, the prior art DC/DC converter 11 must include the output inductance on a PCB for suppressing output noise, which occupies more area on the PCB and further increases power loss.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A DC transformer comprising:
   a magnetic core comprising a first leg, a second leg having a first air gap, and a third leg having a second air gap;
   a primary winding wound around the magnetic core;
   a first secondary winding wound around the first leg and the second leg for generating a first inductance by the first air gap of the magnetic core; and
   a second secondary winding wound around the first leg and the third leg for generating a second inductance by the second air gap of the magnetic core, wherein the number of windings of the first secondary winding wound around the first leg is more than the number of windings of the first secondary winding wound around the second leg, and the number of windings of the second secondary winding wound around the first leg is more than the number of windings of the second secondary winding wound around the third leg.

2. The DC transformer of claim 1, wherein the dimension of each air gap of the magnetic core is between 0.02 and 0.07 mm.

3. The DC transformer of claim 1, wherein the magnetic core is of an EE, EI, EQ or RM type.

4. The DC transformer of claim 1, wherein the primary winding is wound around the first leg.

5. The DC transformer of claim 1, wherein the first leg comprises a third air gap.

6. The DC transformer of claim 1, wherein the first leg has no air gap.

7. The DC transformer of claim 1, wherein the first leg is located between the second leg and the third leg.

8. The DC transformer of claim 1, further comprising two outputs from the first secondary winding and the second secondary winding respectively.

9. The DC transformer of claim 1, wherein the first secondary winding is wound half turn on the second leg, and the second secondary winding is wound half turn on the third leg.

10. A DC transformer comprising:
    a magnetic core comprising a first leg, a second leg having a first air gap, and a third leg having a second air gap;
    a primary winding wound around the magnetic core to receive an input voltage;
    a first secondary winding wound around the first leg, and around the second leg for generating a first inductance by the first air gap of the magnetic core to output a first part of an output voltage; and
    a second secondary winding wound around the first leg, and around the third leg for generating a second inductance by the second air gap of the magnetic core to output a second part of the output voltage.

11. The DC transformer of claim 10, wherein the number of windings of the first secondary winding wound around the first leg is more than the number of windings of the first secondary winding wound around the second leg, and the number of windings of the second secondary winding wound around the first leg is more than the number of windings of the second secondary winding wound around the third leg.

12. The DC transformer of claim 10, wherein the first inductance is an equivalent inductance of the second inductance.

13. The DC transformer of claim 10, wherein the first secondary winding is wound half turn on the second leg, and the second secondary winding is wound half turn on the third leg.

* * * * *